(12) United States Patent
Inoue

(10) Patent No.: US 10,011,323 B2
(45) Date of Patent: Jul. 3, 2018

(54) ELECTRIC VEHICLE

(71) Applicant: KAWASAKI JUKOGYO KABUSHIKI KAISHA, Kobe-shi, Hyogo (JP)

(72) Inventor: Masafumi Inoue, Miki (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 227 days.

(21) Appl. No.: 14/654,627

(22) PCT Filed: Dec. 25, 2012

(86) PCT No.: PCT/JP2012/008230
§ 371 (c)(1),
(2) Date: Jun. 22, 2015

(87) PCT Pub. No.: WO2014/102846
PCT Pub. Date: Jul. 3, 2014

(65) Prior Publication Data
US 2015/0314830 A1    Nov. 5, 2015

(51) Int. Cl.
*B62M 7/04*        (2006.01)
*B62K 11/04*       (2006.01)
(Continued)

(52) U.S. Cl.
CPC ............... *B62M 7/04* (2013.01); *B60K 1/00* (2013.01); *B60L 11/1877* (2013.01);
(Continued)

(58) Field of Classification Search
CPC .. B62K 7/04; B62K 2208/00; B62K 2204/00; B60L 11/1879; B60L 15/007; B60L 11/1877; B60K 1/00
See application file for complete search history.

(56) References Cited

U.S. PATENT DOCUMENTS 6,037,726 A * 3/2000 Tabata ................. B60K 7/0007
                                                180/65.8
9,010,476 B2 * 4/2015 Matsuda ............... B62K 11/04
                                                180/220
(Continued)

FOREIGN PATENT DOCUMENTS

JP    H04244494 A    9/1992
JP    06135371 A     5/1994
(Continued)

OTHER PUBLICATIONS

ISA Japanese Patent Office, International Search Report Issued in Application No. PCT/JP2012/008230, dated Apr. 2, 2013, WIPO, 4 pages.

*Primary Examiner* — Joseph M Rocca
*Assistant Examiner* — Maurice L Williams
(74) *Attorney, Agent, or Firm* — Alleman Hall Creasman & Tuttle LLP

(57) ABSTRACT

An electric vehicle comprises an electric motor which generates a driving power for driving a wheel; and a battery case accommodating a plurality of batteries storing DC power to be supplied to the electric motor, in a battery space in an interior of the battery case, wherein the battery case has a shape which covers the electric motor above and forward.

13 Claims, 6 Drawing Sheets

(51) Int. Cl.
    *B60L 11/18*    (2006.01)
    *B60L 15/00*    (2006.01)
    *B60K 1/00*     (2006.01)
    *B60K 1/04*         (2006.01)
    *B60L 1/08*         (2006.01)
    *B60L 15/20*        (2006.01)

(52) U.S. Cl.
    CPC ......... *B60L 11/1879* (2013.01); *B60L 15/007* (2013.01); *B62K 11/04* (2013.01); *B60K 1/04* (2013.01); *B60L 1/08* (2013.01); *B60L 11/1803* (2013.01); *B60L 11/1864* (2013.01); *B60L 11/1874* (2013.01); *B60L 15/20* (2013.01); *B60L 2200/12* (2013.01); *B60L 2210/40* (2013.01); *B60L 2240/421* (2013.01); *B60L 2240/545* (2013.01); *B60Y 2200/12* (2013.01); *B62K 2204/00* (2013.01); *B62K 2208/00* (2013.01); *Y02T 10/645* (2013.01); *Y02T 10/7005* (2013.01); *Y02T 10/7061* (2013.01); *Y02T 10/7241* (2013.01); *Y02T 10/7275* (2013.01)

(56) References Cited

U.S. PATENT DOCUMENTS

| | | | | |
|---|---|---|---|---|
| 2004/0079574 A1* | 4/2004 | Ono | ............... | B62K 25/283 180/252 |
| 2005/0092538 A1* | 5/2005 | Baldwin | ............... | B62K 11/10 180/220 |
| 2011/0032065 A1* | 2/2011 | Raczkowski | ....... | H01F 27/2804 336/200 |
| 2011/0036657 A1* | 2/2011 | Bland | ............... | B62K 11/06 180/220 |
| 2012/0080254 A1* | 4/2012 | Tsukamoto | ............... | B62M 7/12 180/68.5 |
| 2012/0097463 A1* | 4/2012 | Iwata | ............... | B60K 1/00 180/65.1 |
| 2012/0103706 A1* | 5/2012 | Kondo | ............... | B62M 7/12 180/65.1 |
| 2012/0103716 A1* | 5/2012 | Fujihara | ............... | B60L 11/1877 180/220 |
| 2012/0111651 A1* | 5/2012 | Irie | ............... | B62K 11/04 180/65.1 |
| 2012/0176086 A1* | 7/2012 | Nakamura | ............... | B62J 11/00 320/109 |
| 2012/0222910 A1* | 9/2012 | Miyagawa | ............... | B60L 11/14 180/291 |
| 2012/0241241 A1* | 9/2012 | Takamura | ............... | B62K 23/04 180/335 |
| 2012/0312609 A1* | 12/2012 | Takewaka | ............... | B60Q 5/008 180/65.1 |
| 2012/0318601 A1* | 12/2012 | Kuroki | ............... | B60K 6/48 180/220 |
| 2013/0032427 A1* | 2/2013 | Ishikawa | ............... | B62K 11/04 180/220 |
| 2013/0081894 A1* | 4/2013 | Ishikawa | ............... | B62M 7/04 180/220 |
| 2013/0161108 A1 | 6/2013 | Watanabe et al. | | |
| 2013/0270021 A1* | 10/2013 | Kubanek | ............... | B62K 11/00 180/220 |
| 2013/0270022 A1* | 10/2013 | Matsuda | ............... | B62K 11/04 180/220 |
| 2013/0270025 A1* | 10/2013 | Matsuda | ............... | B62K 11/04 180/220 |
| 2013/0270026 A1* | 10/2013 | Matsuda | ............... | B62J 1/18 180/220 |
| 2013/0270938 A1* | 10/2013 | Matsuda | ............... | B60K 1/00 310/54 |
| 2013/0270940 A1* | 10/2013 | Matsuda | ............... | B62K 11/04 310/64 |
| 2013/0319782 A1* | 12/2013 | Matsuda | ............... | B62K 11/04 180/220 |
| 2014/0262568 A1* | 9/2014 | Matsuda | ............... | B62K 11/04 180/65.1 |
| 2014/0339008 A1* | 11/2014 | Matsuda | ............... | B62K 11/04 180/220 |
| 2014/0345827 A1* | 11/2014 | Matsuda | ............... | B60L 11/1874 165/41 |
| 2014/0367183 A1* | 12/2014 | Matsuda | ............... | B62K 11/04 180/220 |
| 2014/0367184 A1* | 12/2014 | Matsuda | ............... | B62K 11/04 180/220 |
| 2015/0008053 A1* | 1/2015 | Matsuda | ............... | B62K 11/04 180/65.1 |
| 2015/0274019 A1* | 10/2015 | Matsuda | ............... | B62K 11/04 701/22 |
| 2015/0291046 A1* | 10/2015 | Kawabata | ............... | B60L 11/1818 180/220 |
| 2015/0329175 A1* | 11/2015 | Inoue | ............... | B60K 1/04 307/10.1 |
| 2015/0329176 A1* | 11/2015 | Inoue | ............... | B62K 19/30 180/220 |

FOREIGN PATENT DOCUMENTS

| | | |
|---|---|---|
| JP | 2012096594 A | 5/2012 |
| JP | 2012186893 A | 9/2012 |
| JP | 2012192785 A | 10/2012 |
| WO | 2012043562 A1 | 4/2012 |

* cited by examiner

ELECTRIC VEHICLE

TECHNICAL FIELD

The present invention relates to an electric vehicle which drives a wheel with driving power generated in an electric motor.

BACKGROUND ART

In recent years, an electric vehicle which drives a wheel with driving power generated in an electric motor using electric power supplied from batteries has been developed. Patent Literature 1 discloses an electric motorcycle as an exemplary electric vehicle. In this electric motorcycle, a motor is placed below a main frame, and batteries are placed above a rear frame and below a seat.

CITATION LIST

Patent Literature

Patent Literature 1: Japanese Laid-Open Patent Application Publication No. 2012-186893

SUMMARY OF INVENTION

Technical Problem

In order to increase the cruising distance of the vehicle, it is necessary to increase the size of the batteries. However, in the above configuration, the batteries are placed in a relatively high location. Because of the layout of the batteries, the center of gravity of the vehicle body is made higher. This may degrade driving stability of the vehicle.

Accordingly, an object of the present invention is to lower the center of gravity of an electric vehicle to improve driving stability.

Solution to Problem

The present invention provides an electric vehicle comprising: an electric motor which generates driving power for driving a wheel; and a battery case accommodating a plurality of batteries storing DC power to be supplied to the electric motor, in a battery space in an interior of the battery case, wherein the battery case has a shape which covers the electric motor above and forward.

In accordance with the above configuration, since the battery case covers the electric motor above and forward, the center of gravity of the whole battery can be lowered, and driving stability of the electric vehicle can be improved, as compared to a case where the battery case is located only above the electric motor.

The battery case may have a first portion located above the electric motor and a second portion located forward relative to the electric motor, the second portion having a smaller width in a vehicle width direction than the first portion does.

In accordance with this configuration, it becomes possible to increase a bank angle formed when the electric vehicle is inclined and is turning.

The electric vehicle may further comprise a seat which is placed rearward relative to the battery case and on which a driver is seated in a straddle posture, wherein the battery case may have a first portion located above the electric motor and having a shape in which a rear region thereof has a smaller width in a vehicle width direction than a front region thereof.

In accordance with this configuration, the driver seated on the seat of the electric vehicle in the straddle posture can easily grip the rear portion of the first portion of the battery case with the driver's legs. This allows the driver to steer the electric vehicle more easily.

The electric vehicle may further comprise a motor case accommodating the electric motor; an inverter which converts the DC power supplied from the batteries into three-phase AC power; and three electric wires through which the three-phase AC power is supplied from the inverter to the electric motor, wherein the three electric wires may include a first electric wire portion which is connected to the inverter and runs through the interior of the battery case, and a second electric wire portion electrically connected to the first electric wire portion, wherein the second electric wire portion may be an electric cable provided between the battery case and the motor case to couple the battery case and the motor case to each other.

In accordance with this configuration, since the electric cables through which the three-phase AC power is supplied from the inverter to the electric motor is provided between the battery case and the motor case to couple the battery case and the motor case to each other, the electric cables can be made shorter than in a case where the electric cables are provided between the inverter and the electric motor to couple the inverter and the electric motor to each other. Therefore, the operation for installing the high-voltage electric cables can be performed easily and the external appearance of the electric vehicle can be improved.

The electric motor and the battery case may be placed between a front wheel and a rear wheel in a forward and rearward direction, a lower end of the battery case may be located below a pivot shaft of a swing arm supporting the rear wheel, and an upper end of the battery case may be located below a seat on which a driver is seated in a straddle posture.

In accordance with this configuration, since the lower end of the battery case with a heavy weight is located below the pivot shaft of the swing arm and the upper end of the battery case is located below the seat, the battery case is placed as low as possible. This can lower the center of gravity of the electric vehicle.

A space formed between the plurality of batteries or between the batteries and the battery case, in an upper portion of the battery case may overlap with a space formed between the plurality of batteries or between the batteries and the battery case, in a lower portion of the battery case, when viewed from above, and cooling air may be guided to the spaces.

In accordance with this configuration, temperature non-uniformity (difference) between the upper portion of the battery case and the lower portion of the battery case can be prevented.

Advantageous Effects of Invention

As should be appreciated from the above, in accordance with the present invention, the driving stability of an electric vehicle can be improved by lowering the center of gravity of the electric vehicle.

DESCRIPTION OF EMBODIMENTS

Hereinafter, the embodiment will be described with reference to the drawings.

Figure 1:
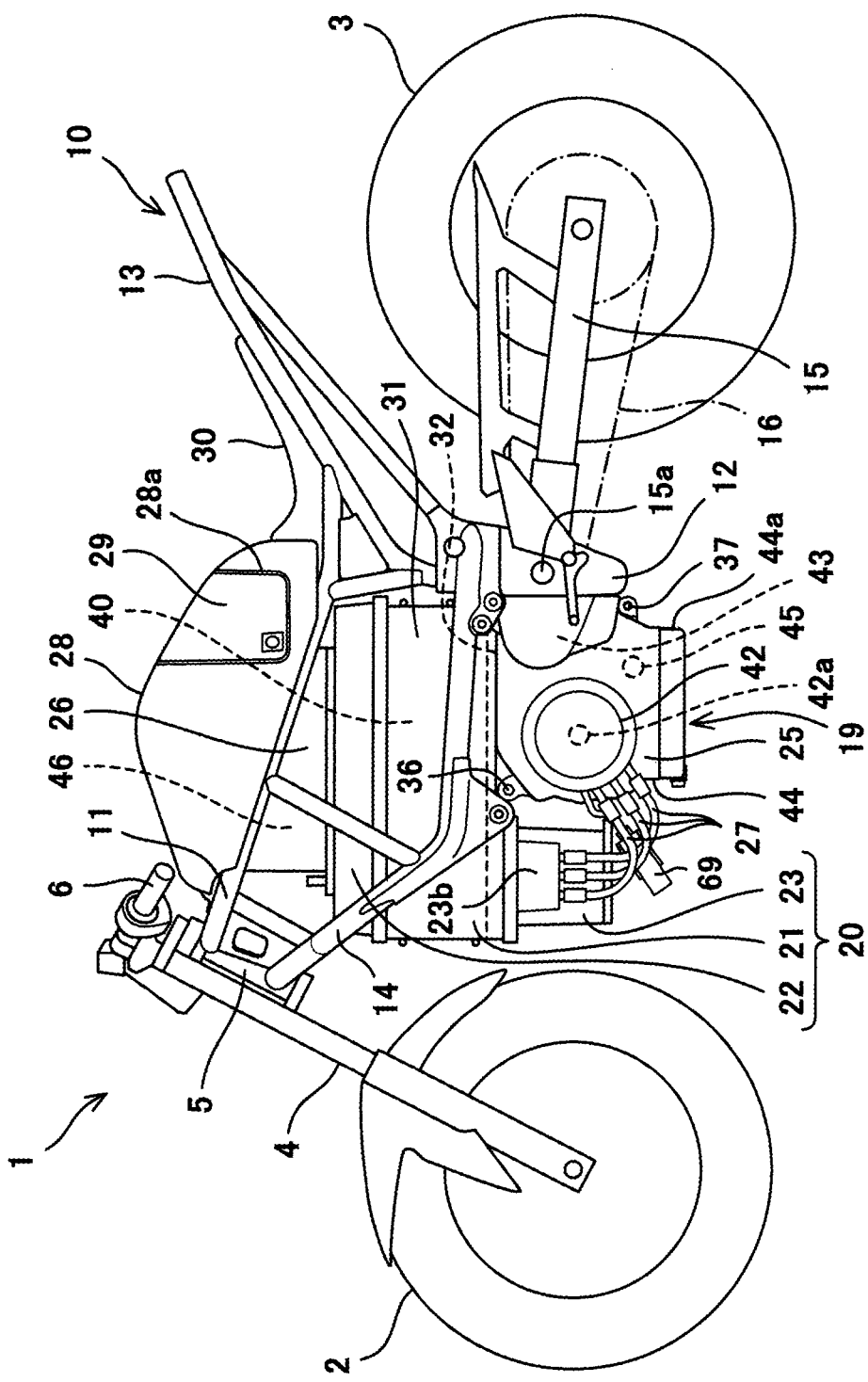
FIG. 1 is a left side view of an electric motorcycle according to an embodiment.

FIG. 1 is a left side view of an electric motorcycle 1 according to the embodiment of the present invention. As shown in FIG. 1, the electric motorcycle 1 which is a straddle-type vehicle includes a front wheel 2 which is a driven wheel, and a rear wheel 3 which is a drive wheel. The front wheel 2 is rotatably mounted to the lower end portion of a front fork 4. The upper portion of the front fork 4 is integrated with a steering shaft (not shown). The steering shaft is rotatably supported by a head pipe 5 of a vehicle body in a state in which the steering shaft is inserted into the head pipe 5. A handle 6 protruding in a rightward and leftward direction is attached to the steering shaft, and an accelerator grip (not shown) is provided at the right side of the handle 6.

A vehicle body frame 10 of the electric motorcycle 1 includes a pair of right and left main frames 11 extending rearward from the head pipe 5 such that they are inclined slightly downward (in FIG. 1, the right main frame is not shown). A pair of right and left down frames 14 are coupled to the front end portions of the main frames 11, respectively such that the down frames 14 extend downward therefrom, and then rearward (in FIG. 1, the right down frame is not shown). The rear end portions of the main frames 11 are connected to the upper portion of a pivot frame 12 of a frame shape. The front end portion of a swing arm 15 is mounted to the pivot frame 12 such that the swing arm 15 supports the rear wheel 3 and is vertically pivotable. A rear frame 13 is placed above the swing arm 15 and is connected to the rear end portions of the main frames 11.

The vehicle body frame 10 supports a power unit 19 in a space formed between the head pipe 5 and the pivot frame 12. The power unit 19 includes a plurality of batteries 40, an electric motor 42, an inverter 47 (see FIG. 2), and others which are integrated. The plurality of batteries 40 are accommodated into a battery case 20. The battery case 20 includes a middle case 21 which has a tubular shape in which upper and lower sides thereof are opened, and the lower end of a rear section is closed, an upper case 22 attached to the middle case 21 to close an upper opening in the middle case 21, and a lower case 23 attached to the middle case 21 to close a lower opening in the front section of the middle case 21.

The middle case 21 includes a case body 31 of a rectangular tubular shape which is made of metal, and a rectangular frame member 32 which is provided inside of the case body 31 and made of metal. The frame member 32 is placed to extend horizontally in the lower portion of the middle case 21. The batteries 40 accommodated in the middle case 21 are supported from below by the frame member 32. The front and rear end portions of the frame member 32 of the middle case 21 are fastened to the down frames 14. In other words, the frame member 32 made of metal which is a portion of the battery case 20 constitutes a portion of the vehicle body frame 10.

A motor unit 25 is mounted to the battery case 20. Specifically, the motor unit 25 is fastened to the middle case 21 and the pivot frame 12 by brackets 36, 37. The motor unit 25 includes a casing 44 (motor case), the electric motor 42 accommodated in the casing 44 to generate a driving power for moving the vehicle body, a transmission 43 accommodated in the casing 44 to change the speed of a rotational driving power output from the electric motor 42, an oil pan 44a attached to the lower portion of the casing 44, and an oil pump 45 which suctions up and discharges oil stored in the oil pan 44a. The rotational driving power output from the transmission 43 is transmitted to the rear wheel 3 via a chain 16.

Figure 2:
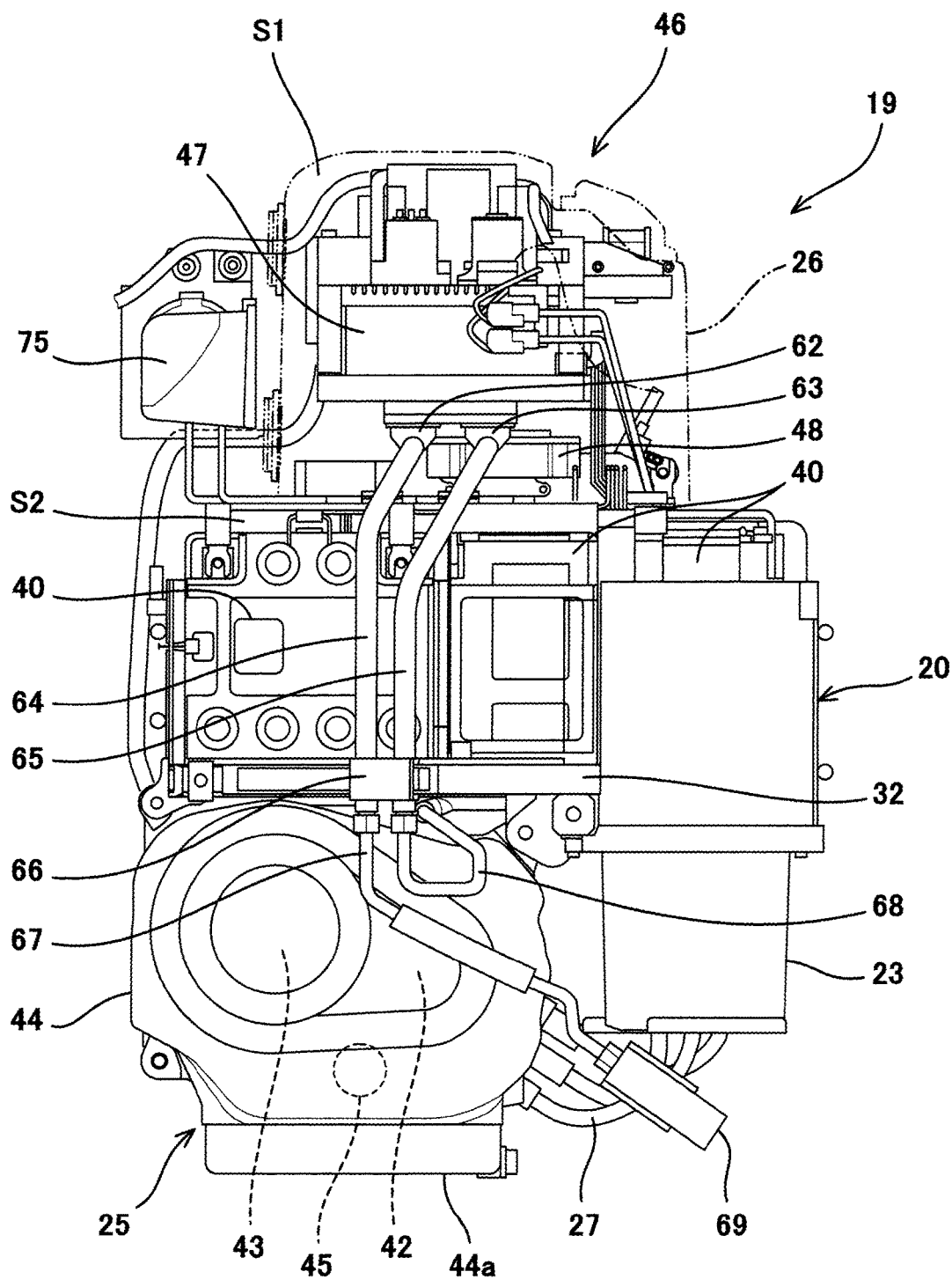
FIG. 2 is a right side view of a power unit of the electric motorcycle of FIG. 1.
Figure 3:
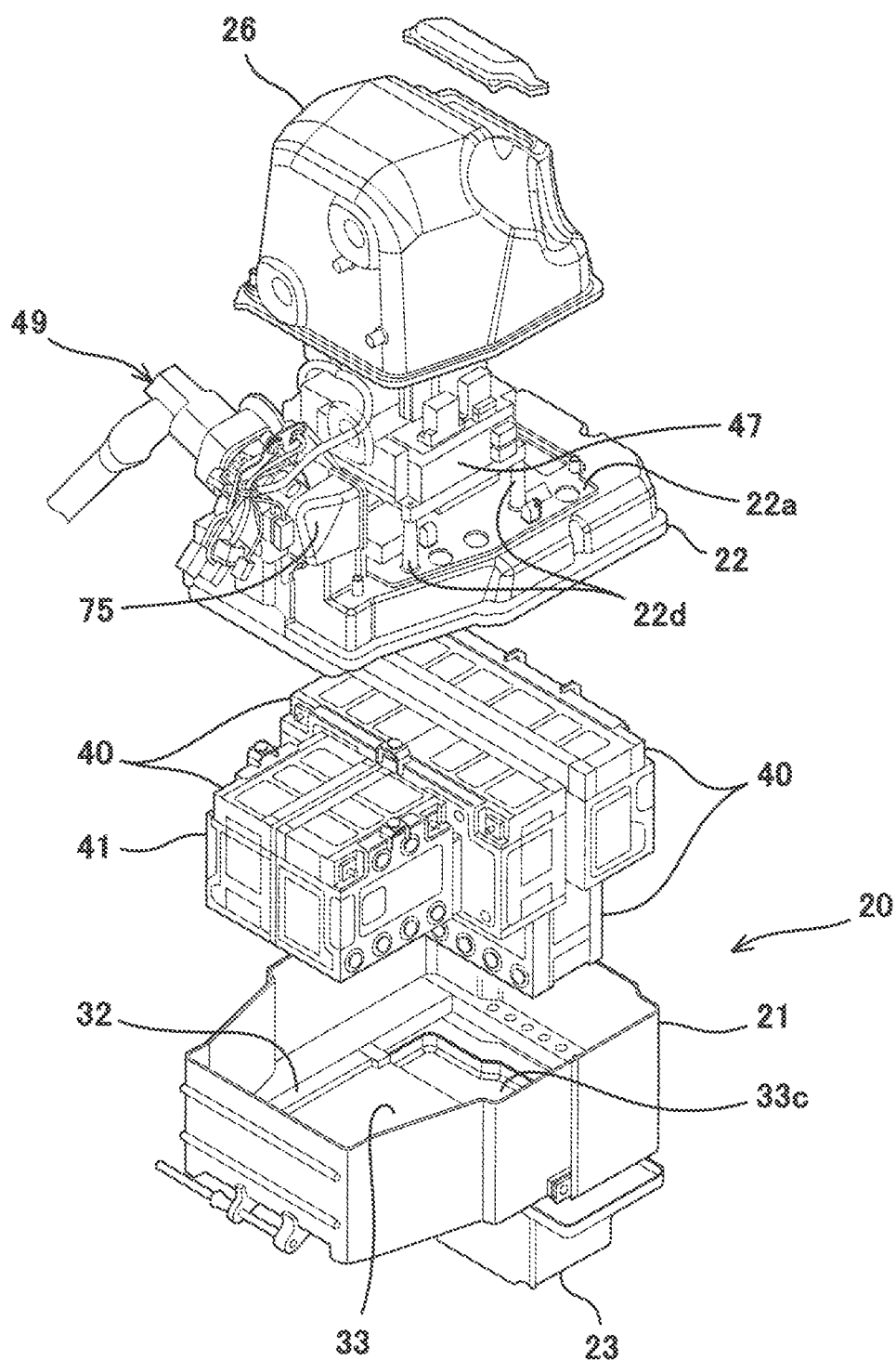
FIG. 3 is an exploded perspective view of the power unit (motor unit is not shown) of the electric motorcycle of FIG. 1, when viewed from the left and front.
Figure 4:
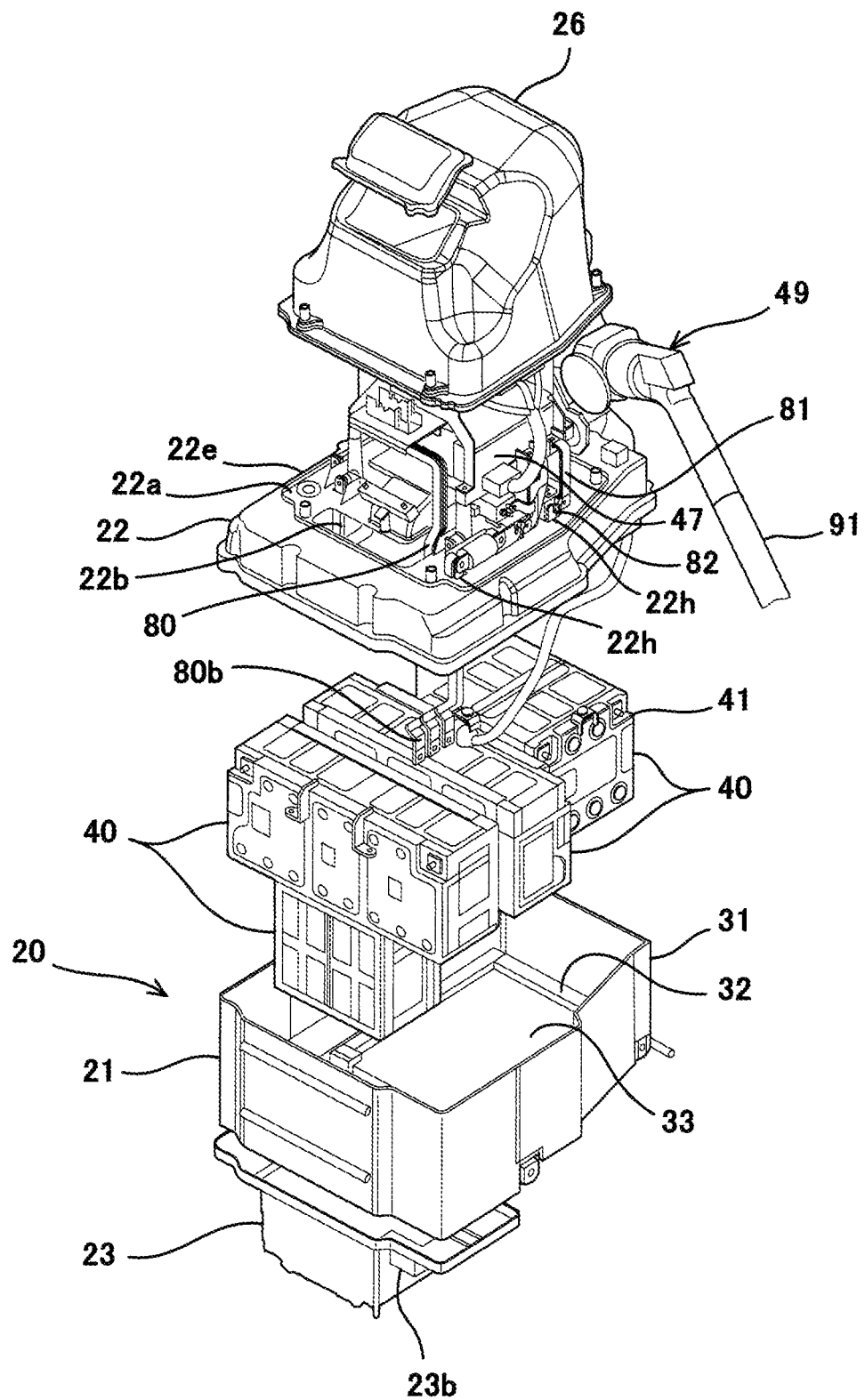
FIG. 4 is an exploded perspective view of the power unit (motor unit is not shown) of the electric motorcycle of FIG. 1, when viewed from the right and rear.
Figure 5:
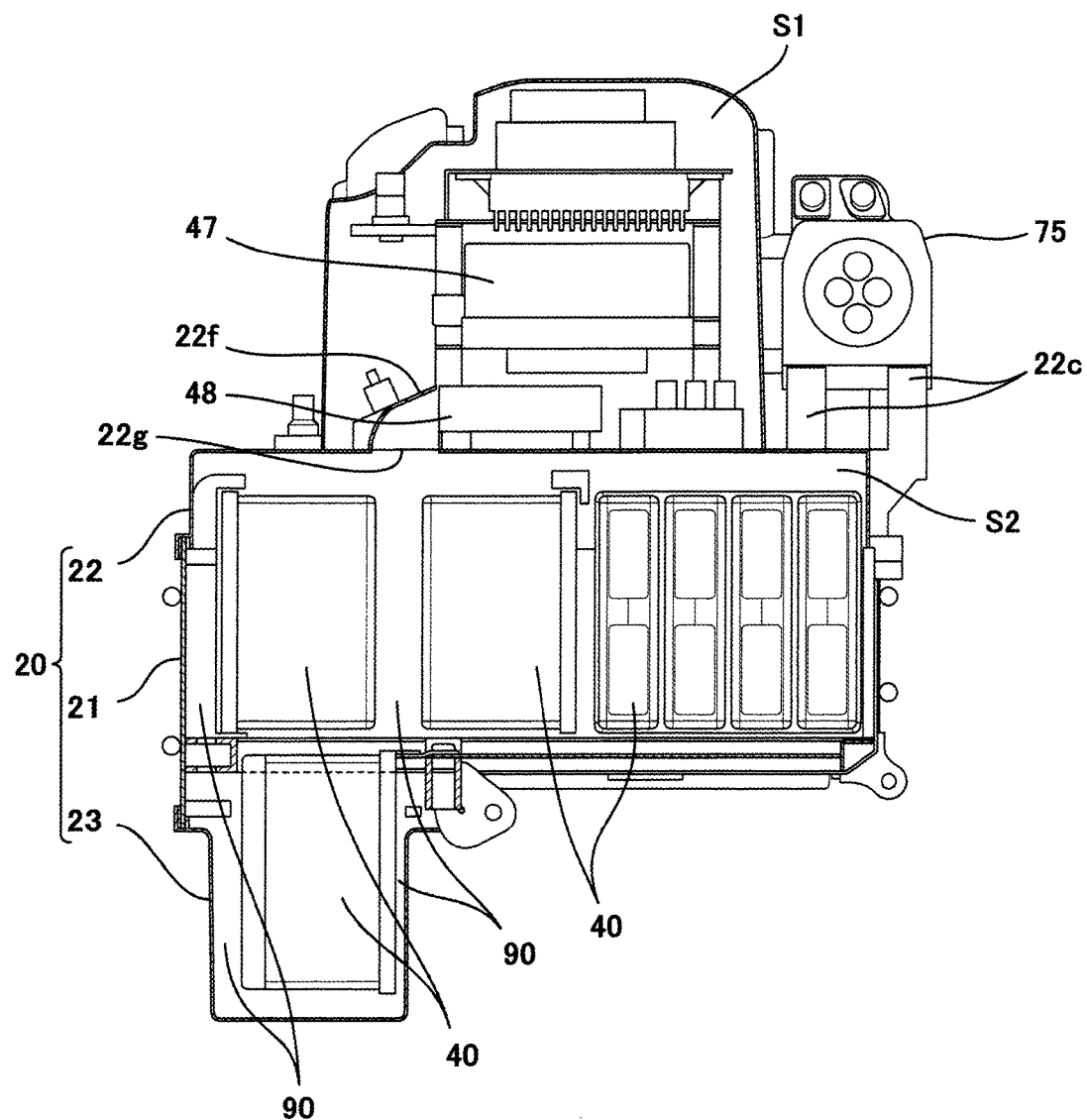
FIG. 5 is a longitudinal sectional view of the power unit (motor unit is not shown) of the electric motorcycle of FIG. 1, when viewed from the left.

FIG. 2 is a right side view of the power unit 19 of the electric motorcycle 1 of FIG. 1. FIG. 3 is an exploded perspective view of the power unit 19 (motor unit is not shown) of the electric motorcycle 1 of FIG. 1, when viewed from the left and front. FIG. 4 is an exploded perspective view of the power unit 19 (motor unit is not shown) of the electric motorcycle 1 of FIG. 1, when viewed from the right and rear. FIG. 5 is a longitudinal sectional view of the power unit 19 (motor unit is not shown) of the electric motorcycle 1 of FIG. 1, when viewed from the left. As shown in FIGS. 2 to 5, the plurality of batteries 40 storing DC power to be supplied to the electric motor 42 are aligned in a battery space S2 in the interior of the battery case 20. The plurality of batteries 40 are integrated by a casing 41 as an assembly to form a battery group.

The battery group is symmetric in the vehicle width direction. Each of the plurality of batteries 40 has a rectangular parallelepiped shape. The plurality of batteries 40 include two kinds of batteries which have different long side dimensions, when viewed from above. Hereinafter, depending on the case, the batteries with a larger long side dimension will be referred to as "larger batteries", while the batteries with a smaller long side dimension will be referred to as "smaller batteries".

The battery group has an inverted-L shape when viewed from a side. The plurality of batteries 40 are aligned in such a manner that the lower surface of the front section of the battery group is located below the lower surface of the rear section of the battery group, the upper surface of the battery group is substantially flat without a level difference, and the front surface of the battery group is substantially flat without a level difference. In other words, the battery group of the plurality of batteries 40 includes the front section composed of upper and lower parts and the rear section which is equal in vertical dimension to the upper part of the front section. This makes it possible to prevent an increase in the dimension of the whole batteries 40 in the rightward and leftward direction while increasing the capacity of the whole of the batteries 40.

When viewed from the front, the battery group has a T shape and is symmetric in the vehicle width direction. The plurality of batteries 40 are aligned in such a manner that the upper part of the front section of the battery group has a larger width than the lower part of the front section of the battery group. In this structure, the upper part of the front section of the battery group is formed with a lateral protruding section protruding to both sides in the vehicle width direction from the perspective of the lower part of the front section. The plurality of batteries 40 are aligned in such a manner that the lower surface of the lateral protruding section is substantially coplanar with the lower surface of the rear section of the battery group.

When viewed from above, the battery group has a T shape and is symmetric in the vehicle width direction. The plurality of batteries 40 are aligned in such a manner that the upper part of the front section of the battery group has a larger width than the rear section.

The specific example of the alignment of the plurality of batteries 40 will now be described. In the upper part of the front section, the larger batteries are placed such that their long sides correspond with the rightward and leftward direction. In the lower part of the front section, the smaller battery is placed such that its long side corresponds with the rightward and leftward direction. In the rear section, the smaller battery is placed such that its long side corresponds with the forward and rearward direction. The layout in which one battery is included in the vertical direction in each of the upper part of the front section, the lower part of the front section, and the rear section is merely exemplary, and a plurality of batteries may be stacked together in the vertical direction in each of the upper part of the front section, the lower part of the front section, and the rear section. Also, the layout in which two batteries are included in the forward and rearward direction in the upper part of the front section and one battery is included in the forward and rearward direction in each of the lower part of the front section and the rear section is merely exemplary. Thus, the number of batteries aligned in the forward and rearward direction in each of the sections may be suitably changed.

As described above, the group of the plurality of batteries 40 is aligned in such a manner that the front section has a larger width than the rear section in the vehicle width direction (rightward and leftward direction). This makes it possible to prevent an increase in the vertical dimension of the whole of the batteries 40 while increasing the capacity of the whole of the batteries 40. Correspondingly, each of the middle case 21 and the upper case 22 has a shape in which its front portion has a larger width than its rear portion. In other words, the middle case 21 and the upper case 22 accommodate the upper part of the front section of the battery group and the rear section of the battery group, while the lower case 23 accommodates the lower part of the front section of the battery group.

The rear region of the region of the middle case 21 which is surrounded by the frame member 32, is closed by a bottom plate 33 made of metal, which is fastened to the frame member 32 by welding, while the front region of the region of the middle case 21, which is surrounded by the frame member 32, forms an opening 32c which is in communication with the inner space of the lower case 23. In the interior of the middle case 21 and the upper case 22, the plurality of batteries 40 are accommodated such that they are placed on the frame member 32 and the bottom plate 33. The batteries 40 are also accommodated in the interior of the lower case 23. In other words, the middle case 21 and the upper case 22 constitute an upper battery accommodating section, while the lower case 23 constitutes a lower battery accommodating section. The lower case 23 as the lower battery accommodating section is shorter in length in the forward and rearward direction than the middle case 21 and the upper case 22 as the upper battery accommodating section, and is connected to the front lower portion of the middle case 21. The motor unit 25 is placed immediately behind the lower case 23 and immediately below the middle case 21.

As described above, the battery case 20 covers the electric motor 42 above, and forward. To cover the electric motor 42 in this way, the battery case 20 has an inverted-L shape when viewed from a side. This makes it possible to lower the center of gravity of the whole batteries 40 as compared to a case where the battery case 20 is located only above the electric motor 42. Therefore, the driving stability of the electric motorcycle 1 can be improved.

A portion (in the present embodiment, lower case 23) of the battery case 20, which is located forward relative to the electric motor 42 has a smaller width in the vehicle width direction than a portion (in the present embodiment, middle case 21) of the battery case 20, which is located above the electric motor 42. The electric motorcycle 1 is able to turn at a high speed or with a small radius against a centrifugal force by banking the vehicle body. In a case where the portion of the battery case 20 which is located forward relative to the electric motor 42 has a small width, the battery case 20 does not collide with a road surface even when the vehicle body is banked at a large angle. The above structure makes it possible to locate the battery case 20 at a lower side to lower the center of gravity of the vehicle body and ensure the turn performance of the electric motorcycle 1. Correspondingly, the battery group is placed such that the lower part of the front section has a smaller width than the upper part of the front section in the vehicle width direction (rightward and leftward direction).

Turning back to FIG. 1, the battery case 20 is mounted and fastened to the vehicle body frame 10 in such a manner that the frame member 32 provided on the inner lower portion of the middle case 21 is fastened to the pair of right and left down frames 14. This allows the battery case 20 to be located as low as possible. As a result, the center of gravity of the vehicle body can be lowered.

In the state in which the battery case 20 is mounted to the vehicle body frame 10 as described above, the lower case 23 and the motor unit 25 are located below the down frames 14. In the present embodiment, the rotary shaft 42a of the electric motor 42 is located below the pivot shaft 15a of the swing arm 15 mounted to the pivot frame 12. The lower surface of the battery group (to be precise, the lower end of the battery case 20) is located below the rotary shaft 42a of the electric motor 42 and below the pivot shaft 15a of the swing arm 15. In a motorcycle incorporating an engine, an exhaust pipe extends in the forward and rearward direction in the lower portion of the entire motorcycle. In contrast, the exhaust pipe and a muffler connected to the exhaust pipe are not required in the electric motorcycle 1. Because of this, it becomes possible to lay out the battery case 20 and the motor unit 25 as described above. The lowermost surface (lower surface of the front lower section) of the battery group is located above the lower end of the motor unit 25. The lower end of the battery case 20 is located above the lower end of the motor unit 25. A radiator 69 is placed below the battery case 20 and forward relative to the motor unit 25.

The rotary shaft 42a of the electric motor 42 is placed below the middle case 21. The electric motor and the lower case are arranged in the forward and rearward direction substantially at the same height in a vertical direction. Therefore, even when the front section of the battery group is provided with the portion protruding downward, it becomes possible to prevent a situation in which the center of gravity of the whole power unit 19 including the motor unit 25 is located at a front side, and to locate the center of gravity of the whole power unit 19 in the vicinity of the center portion of the power unit 19 in the forward and rearward direction. The motor unit 25 includes the oil pan 44a. The center of the oil pan 44a in the forward and rearward direction is located rearward relative to the center of the battery group in the forward and rearward direction. In the present embodiment, substantially the entire oil pan 44a is located rearward relative to the center of the battery group in the forward and rearward direction. An electric component group 46 including the inverter 47 is placed rearward relative to the foremost surface (front surface of the upper part of the front section) of the battery group. Such a layout also makes it possible to prevent a situation in which the center of gravity of the whole power unit 19 is located at a front side.

The seat 30 on which the driver is seated is supported on the vehicle body frame 10. The seat 30 extends in the forward and rearward direction from the rear portions of the main frames 11 to the rear frame 13. The upper surface of the battery group (to be precise, the upper end of the battery case 20) is placed substantially as high as or above the seat 30. In the present embodiment, the upper case 22 is located below the main frames 11, while the upper surface of the battery group (to be precise, the upper end of the battery case 20) is located slightly below the seat 30. From another perspective, the upper surface of the battery group (to be precise, the upper end of the battery case 20) is located below a virtual line connecting the seat 30 to the handle 6.

The vertical center portion (e.g., middle case 21) of the battery case 20 is made of metal, while the upper portion (e.g., upper case 22) of the battery case 20 is made of a material (e.g., synthetic resin such as polypropylene) with a specific weight smaller than that of the center portion. By selecting such a material, the center of gravity can be lowered more effectively.

Since the battery case 20 is supported on the vehicle body frame 10 in the above described manner, the battery case 20 can be placed on the center of the electric motorcycle 1 in the vehicle width direction. This allows the center of gravity of the whole electric motorcycle 1 to be located in the vicinity of the center in the vehicle width direction. As a result, the driver can steer the electric motorcycle 1 more easily. The battery group accommodated in the battery case is symmetric in the vehicle width direction, and the center of gravity of the battery group is easily placed at the center of the electric motorcycle 1 in the vehicle width direction. Since the center of gravity of the battery group with a heavy weight is placed in this way, the driver can steer the electric motorcycle 1 more easily. Also, the upper part of the battery group can be placed between the pair of right and left down frames 14. Even if the electric motorcycle 1 falls, the batteries 40 can be protected by the down frames 14.

Since the battery case 20 is supported on the vehicle body frame 10 in the above described manner, the battery case 20 and the motor unit 25 are placed between the front wheel 2 and the rear wheel 3 in the forward and rearward direction. More specifically, the battery case 20 is placed between the head pipe 5 (or meter) and the seat 30, and at least a portion of the battery case 20 is placed above and forward relative to foot steps of the vehicle body and between the legs of the driver seated on the seat 30. The upper surface of the battery group in the interior of the battery case 20 is located above the foot steps. The electric motor 42 is placed between the head pipe 5 (or meter) and the seat 30. The motor unit 25 is mounted to the front side of the pivot frame 12 and is not pivoted together with the swing arm 15. The rotary shaft 42a of the electric motor 42 is located forward relative to the pivot shaft 15a of the swing arm 15. On the other hand, the swing arm 15 is displaced relative to the electric motor 42.

The rear portion of the middle case 21 and the rear portion of the upper case 22 are placed below and forward relative to the seat 30, in close proximity to the seat 30. When the driver is seated on the seat 30 and puts their legs on the foot steps, their legs are at the side regions of the rear portion of the upper case 22 and the side regions of the rear portion of the middle case 21. As described above, the battery group is configured such that its rear section has a smaller width than its front section, and correspondingly, each of the middle case 21 and the upper case 22 has a shape in which its rear portion has a smaller width than its front portion. The driver can easily grip this smaller-width portion with their legs. Thus, the driver can steer the electric motorcycle more easily.

An electric component cover 26 is attached to the upper surface of the battery case 20. The electric component cover 26 and the upper case 22 define an electric component space S1 (see FIG. 4) in which the electric component group 46 including the inverter 47 (see FIGS. 2 to 4) is accommodated. The electric component cover 26 is covered by an upper cover 28 which is a dummy tank which looks like a fuel tank of a conventional engine-driven motorcycle. The rear portion of the upper cover 28 is formed with a connector opening 28a through which a charging connector (not shown) is exposed. The connector opening 28a is closed by a connector lid member 29.

The upper end of the battery case 20 is located substantially as high as or below the seat 30. In this configuration, even when the electric component group 46 including the inverter 47 and the like is placed on the battery case 20, it becomes possible to lessen the amount of the electric component group 46 which protrudes upward from a virtual line connecting the seat 30 to the head pipe 5.

Turning back to FIGS. 2 to 5, the upper surface of the upper case 22 of the battery case 20 is formed with an electric component region 22a surrounded by a peripheral rib 22e. The electric component cover 26 is placed over the upper surface of the upper case 22 along the peripheral rib 22e, thereby forming the electric component space S1 surrounded by the inner surface of the electric component cover 26 and the upper surface of the upper case 22. The electric component group 46 is placed within the electric component region 22a and accommodated in the electric component space S1. The electric component group 46 includes electric components associated with a high-voltage current of the batteries 40, through which the high-voltage current flows. For example, this electric component includes the inverter 47 (switching device). Or, the electric component group 46 may include electric components associated with a current of a voltage lower than the voltage of the batteries 40. Such electric components include the fan 48. The charging connector 75 is placed outward and rearward relative to the electric component cover 26 and supported on the seat section 22c protruding from the upper surface of the upper case 22. The charging connector 75 may be connected to a power supply connector 49 connected to an outside power supply (not shown) via a cable 91.

The fan 48 is mounted on the center portion of the electric component region 22a. The upper wall of the upper case 22 is formed with an air inlet 22g via which the electric component space S1 is in communication with the battery space S2. The fan 48 causes the air to flow from the interior of the electric component space S1 into the battery space S2 through the air inlet 22g. The upper case 22 is formed with a duct member 22f connecting the discharge outlet of the fan 48 to the air inlet 22g. From the electric component region 22a, a plurality of support elements 22d on which the inverter 47 is to be mounted protrude upward. The support elements 22d are arranged at different positions apart from each other to surround the fan 48. In the state in which the inverter 47 is mounted on the support elements 22d, the inverter 47 is placed to overlap with the fan 48 from above and with a slight gap from the fan 48 in the vertical direction.

The inverter 47 is placed above the battery case 20, to overlap with the battery case 20 when viewed from above. More specifically, the inverter 47 is placed above the battery case 20 to be included within the battery case 20 when viewed from above such that the inverter 47 is located inward relative to front, rear, right and left edges of the battery case 20. The inverter 47 has a flat shape in which a vertical dimension is smaller than a dimension in the forward and rearward direction and a dimension in the rightward and leftward direction. This makes it possible to prevent an increase in the size of the electric component space S1 in the vertical direction, due to the layout of the inverter 47. Even when the electric component group 46 is placed on the battery case 20, it becomes possible to prevent a significant increase in the size of the electric component cover 26 in the vertical direction.

Figure 6:
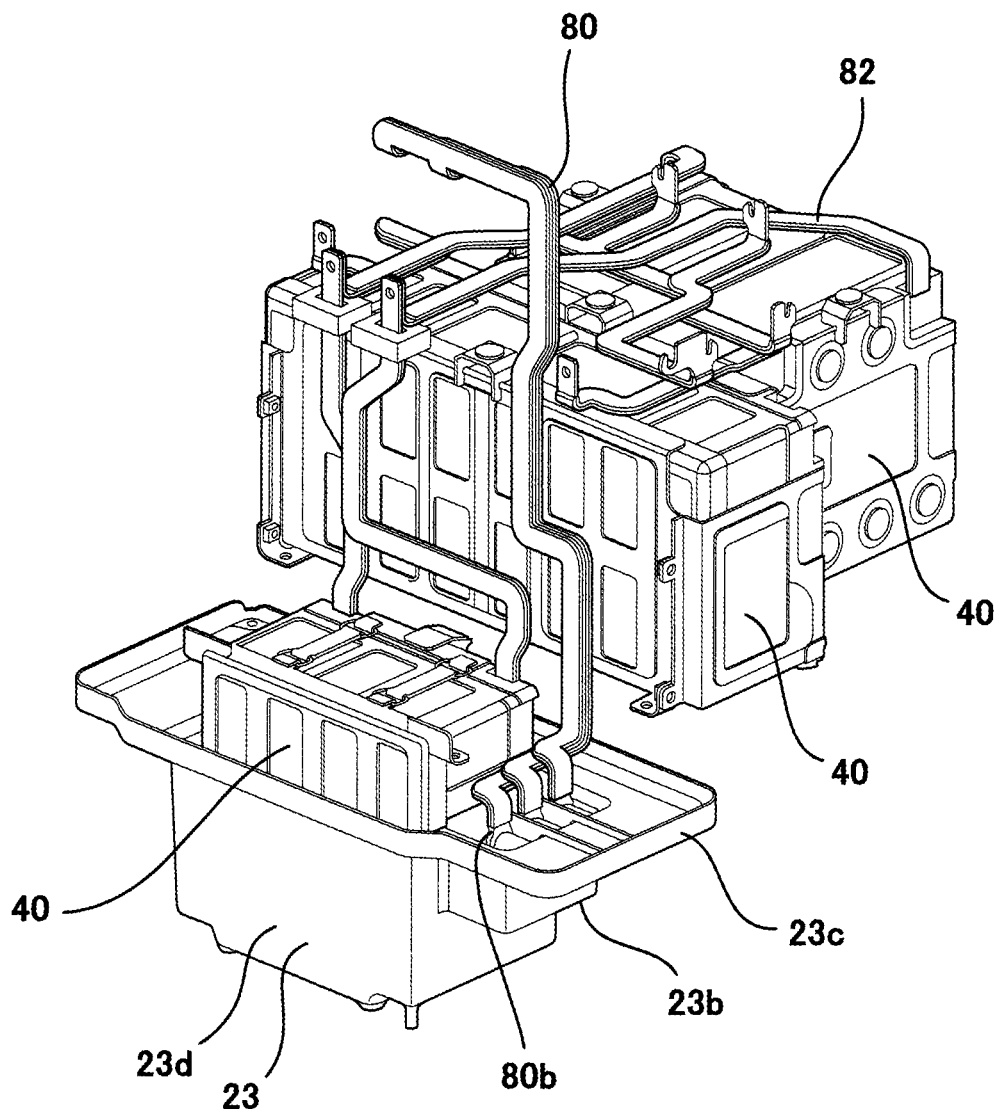
FIG. 6 is a perspective view of major components for explaining bus bar modules in the interior of the battery case of the electric motorcycle of FIG. 1.

FIG. 6 is a perspective view of major components for explaining bus bar modules 80, 82 in the interior of the battery case 20 of the electric motorcycle 1 of FIG. 1. As shown in FIG. 6, the batteries 40 are interconnected in series by the bus bar module 82. The positive terminal and negative terminal of the battery group connected in series are connected to a bus bar module 81 (see FIG. 4) provided in the electric component space S1 to connect the battery group to the inverter 47. The upper surface of the battery case 20 is provided with an opening 22h (see FIG. 4) through which the bus bar module 81 and/or the bus bar module 82 penetrate the battery case 20.

The inverter 47 is connected to the electric motor 42 via the electric wire. In the present embodiment, a portion (first electric wire portion) of this electric wire is the bus bar module 80. The bus bar module 80 extends from the inverter 47 and runs vertically through the internal space of the battery case 20. The bus bar module 80 includes three bus bars of metal plates stacked together, which are insulatively bonded together and integrated, and which are electric wires used to supply a three-phase AC current from the inverter 47 to the electric motor 42. Thereby, the bus bar module 80 can be handled easily. The upper end portion of the bus bar module 80 is connected to the inverter 47 (see FIGS. 2 to 5). The bus bar module 80 runs from the electric component space S1 into the battery space S2 through the opening 22b formed in the electric component region 22a. In FIG. 6, the battery of the battery group, which is accommodated in the middle case 21 and placed at a foremost location, is not shown. In the interior of the upper case 22 and the interior of the middle case 21, of the battery space S2, the bus bar module 80 runs vertically through a space 90 formed between the battery placed at the foremost location and the battery 40 placed behind and adjacently to the battery placed at the foremost location. In the interior of the battery case 20, the bus bar module 80 runs from the middle case 21 into the lower case 23. Terminal sections 80b at the lower end of the bus bar module 80 are placed in the terminal accommodating section of the lower case 23.

As described above, the middle case 21 is configured such that the front region of the lower end is opened, while the lower case 23 closes this opening from below, while the lower case 23 has a smaller width than the middle case 21 in the vehicle width direction. In the present embodiment, the upper end portion 23c of the lower case 23 is connected to the front region of the lower end portion of the middle case 21. Only the upper end portion 23c conforms in dimension to the middle case 21. The upper end portion 23c has a larger width than the remaining portion 23d of the lower case 23. The three bus bars of the bus bar module 80 extend from rearward to forward inside of the upper end portion 23c of the lower case 23, which has a small depth such that the three bus bars are different from each other in extension amount. The three terminal sections 80b of the bus bar module 80 extend downward from the front end portions of the three bus bars, respectively. The three terminal sections 80b of the bus bar module 80 are accommodated into the terminal accommodating section 23b recessed downward in the upper end portion 23c of the lower case 23 and arranged in the forward and rearward direction. Alternatively, the terminal accommodating section 23b may protrude from the side surface of the remaining portion 23d of the lower case 23.

As shown in FIG. 1, the terminal sections inside of the terminal accommodating section 23b are connected to the electric motor 42 via the three high-voltage electric cables 27 as a portion (second electric wire portion) of the electric wires. The three electric cables 27 are placed outside of the battery case 20 and outside of the motor unit 25. In this case, the lower case 23 is adjacent to the electric motor 42 in the forward and rearward direction and covers the electric motor 42 from the front. Therefore, the electric cables 27 exposed to the outside can be reduced in length. Since a harness with a large diameter can be prevented from largely occupying the external appearance, the external appearance of the electric motorcycle 1 can be improved. Also, since an insulative outer cover for covering the electric cables 27 can be lessened, the electric wires can be manufactured at low cost. Since the electric cables 27 are placed above the front end portion of the radiator 69, it becomes possible to prevent the electric cables 27 from contacting outside obstacles.

As described above, the inverter 47 is placed above the battery case 20, while the electric motor 42 is placed below the battery case 20. In other words, the inverter 47 and the electric motor 42 are placed to vertically interpose the battery case 20 between them and the inverter 47 is adjacent to the electric motor 42 in the forward and rearward direction. In this configuration, the bus bar module 80 can be extended substantially linearly in the vertical direction, while lessening the extension amount in the forward and rearward direction.

The electric motor 42 is placed below the battery case 20. In particular, in the present embodiment, the battery case 20 has an inverted-L shape when viewed from a side, and the front portion of the battery case 20 protrudes downward farther than the rear portion of the battery case 20. The electric motor 42 is placed below the rear portion of the battery case 20 and rearward relative to the front portion of the battery case 20. The upper surface of the electric motor 42 allows the lower surface of the battery case 20 to be located as low as possible. Since the terminal block 23b of the electric motor 42 is placed below the upper surface of the batteries, at least a portion of the electric wire connecting the inverter 47 to the electric motor 42 runs through the interior of the battery case 20.

The electric wire includes the first electric wire portion extending from the inverter 47 and the second electric wire portion connecting the first electric wire portion to the electric motor 42. The first electric wire portion is placed in the interior of the battery case 20. Therefore, the first electric wire portion, the battery case, the electric component cover attached to the battery case, the batteries accommodated in the battery case, and the electric component group accommodated inside of the electric component cover can be configured as a sub-assembly. Therefore, the mounting accuracy of the first electric wire portion with respect to the inverter 47 and the terminal accommodating section 27c is permitted to be controlled relatively tightly. Therefore, the first electric wire portion need not have a high flexibility. For this reason, the bus bar module 80 comprising a metal material with a high heat radiation property and a high conduction property is suitably used as the first electric wire portion. As the second electric wire portion, the electric cables 27 as linear members having higher flexibility than the first electric wire portion (bus bar module 80) are used. The electric cables 27 can absorb a mounting error between the battery case 20 and the electric motor 42.

As shown in FIG. 5, in the state in which the battery group is accommodated in the battery space S2, spaces 90 are formed between the batteries 40 and between the batteries 40 and the battery case 20. The spaces are opened in the air inlet 22g. The air (cooling air) from the fan 48 flows through the spaces 90. The spaces 90 are in communication with the air outlet (not shown) formed on the battery case 20. The air flows through the spaces 90 and thereafter is discharged outside of the battery case 20 through the outlet. The air takes heat out of the batteries 40 while flowing through the spaces 90, and thus the batteries 40 are cooled by the air.

The batteries 40 can be divided into the upper section accommodated in the middle case 21 and the upper case 22, and the lower section accommodated in the lower case 23. The spaces 90 corresponding to the lower section include the space formed between the battery 40 and the front wall of the lower case 23, and the space formed between the battery 40 and the rear wall of the lower case 23. Although not shown, the spaces 90 corresponding to the lower section also include the space formed between the batteries 40 and the side wall of the lower case 23. The spaces 90 corresponding to the upper section include the space formed between the battery 40 placed at the foremost location and the front wall of the middle case 21, the space formed between the battery 40 placed at the foremost location and the battery 40 placed behind the battery 40 placed at a foremost location, and the space formed between the battery 40 placed at a rearmost location and the rear wall of the middle case 21. The spaces 90 corresponding to the upper section also include the space formed between the battery 40 placed at the foremost location and the side wall of the middle case 21.

The space 90 corresponding to the lower section is placed to overlap with the space 90 corresponding to the upper section when viewed from above, and is in communication with the space 90 corresponding to the upper section linearly in the vertical direction. Specifically, the space 90 formed between the battery 40 and the front wall of the lower case 23 vertically overlaps with the space 90 formed between the battery 40 placed at the foremost location in the upper section and the front wall of the middle case 21, when viewed from above. The space 90 formed between the battery 40 and the rear wall of the lower case 23 vertically overlaps with the space 90 formed between the battery 40 placed at the foremost location in the upper section and the battery 40 placed behind the battery 40 placed at the foremost location in the upper section, when viewed from above. In this way, the space 90 in the lower portion of the battery case 20 overlaps with the space 90 in the upper portion of the battery case 20, and conforms in position to the space 90 in the upper portion, when viewed from above. This structure allows the air from the air inlet 22g to be easily guided from the upper portion of the battery case 20 to the lower portion of the battery case 20. This makes it possible to very uniformly air-cool the upper section of the batteries 40 and the lower section of the batteries 40. As a result, it becomes possible to suppress temperature non-uniformity in the interior of the battery case 20.

As shown in FIG. 2, in the interior of the casing of the inverter 47, cooling medium passages (not shown) through which the oil as the cooling medium flows are provided, and the lower portion of the inverter 47 is provided with a cooling medium inlet 62 and a cooling medium outlet 63 which are in communication with the cooling medium passages. Cooling medium pipes 64, 65 are connected to the cooling medium inlet 62 and the cooling medium outlet 63, respectively. The cooling medium pipes 64, 65 penetrate the upper wall of the upper case 22 and run through the internal space of the battery case 20. The cooling medium pipes 64, 65 are connected to cooling medium pipes 67, 68, respectively, via a joint 66. The cooling medium pipe 67 is connected to the oil cooler 69, while the cooling medium pipe 68 is connected to the casing 44 of the motor unit 25. The oil flows into the casing 44 through the cooling medium pipe 68, cools or lubricates the electric motor 42 or the transmission 43, and then is gathered in the oil pan 44a. The oil accumulated in the oil pan 44a is suctioned up by the oil pump 45, and then is discharged to the oil cooler 69. After flowing through the oil cooler 69, the oil is guided to the inverter 47 through the cooling medium pipes 67, 64. In this way, the cooling medium pipes 64, 65, 67, 68 are used to circulate the cooling medium to the motor unit 25 and to the inverter 47. Specifically, the cooling medium pipes 64, 65, 67, 68 run vertically through the internal space of the battery case 20 to circulate the cooling medium to cooling components (motor unit 25, oil pan 44a, oil pump 45, oil cooler 69, etc.) provided below the battery case 20 and to the inverter 47 provided above the battery case 20.

The motor unit 25 including the oil pan 44a and the oil pump 45 is close to the inverter 47 in the forward and rearward direction. This can reduce the length of each of the cooling medium pipes 64, 65, 67, 68 in the forward and rearward direction, and hence a pressure loss. The motor unit 25 and the inverter 47 are vertically spaced apart from each other with the battery case 20 interposed between them. Because of this, most parts of the cooling medium pipes 64, 65, 67, 68 can be accommodated into the battery space S1 and the electric component space S2, the cooling system of the inverter 47 can be protected from the outside world, and the driver can be protected from the cooling system. The battery group has a shape in which its rear section has a smaller width than its front section does. The joint 66 is attached on the side portion of the rear section with a smaller width. The cooling medium pipes 64, 65, 67, 68 run vertically through a region lateral relative to the rear section. In this way, the cooling medium pipes 64, 65, 67, 68 are laid out by making use of a dead space in the interior of the battery case 20. Thus, it becomes possible to avoid an increase in the size of the battery case 20, due to the presence of the cooling medium pipes 64, 65, 67, 68 running through the interior of the battery case 20.

The present invention is not limited to the above-described embodiment. The above-described configuration may be changed, added to, or deleted from, within a scope of the spirit of the present invention. For example, the inverter 47 may not be accommodated in the electric component cover 26 attached onto the upper surface of the battery case 20, and may be accommodated in the battery case 20. Although a part of the electric wires connecting the inverter 47 to the electric motor 42 (bus bar module 80 as the first electric wire portion) and a part of the cooling medium pipes extending between the motor unit 25 and the inverter 47 run through the interior of the battery case 20, the entire electric wire or the entire cooling medium pipes may be placed outside of the battery case 20.

INDUSTRIAL APPLICABILITY

As described above, the electric vehicle of the present invention can obtain a clear advantage that driving stability can be improved by lowering the center of gravity of the vehicle body, which is effectively applicable to the electric vehicle such as the electric motorcycle which can exhibit this advantage.

REFERENCE CHARACTER LIST

1 electric motorcycle
2 front wheel
3 rear wheel
15 swing arm
15a pivot shaft
19 power unit
20 battery case
25 motor unit
27 electric cable
30 seat
40 battery
42 electric motor
44 casing
47 inverter
80-82 bus bar module
90 space

The invention claimed is:

1. An electric vehicle comprising:
an electric motor which generates a driving power for driving a wheel;
a battery case accommodating a plurality of batteries storing DC power to be supplied to the electric motor, in a battery space in an interior of the battery case; and
an inverter which converts the DC power supplied from the batteries into an AC power,
wherein the battery case has a shape which covers the electric motor above and forward,
wherein the electric motor and the battery case are placed between a front wheel and a rear wheel in a forward and rearward direction,
wherein a lower end of the battery case is located below a pivot shaft of a swing arm supporting the rear wheel, and an upper end of the battery case is located below a seat on which a driver can be seated in a straddle posture, and
wherein the inverter is placed above the battery case.

2. The electric vehicle according to claim 1, further comprising:
a motor case accommodating the electric motor; and
an electric wire through which the AC power is supplied from the inverter to the electric motor,
wherein the electric wire includes a first electric wire portion which is connected to the inverter and runs through the interior of the battery case, and a second electric wire portion electrically connected to the first electric wire portion, and
wherein the second electric wire portion is an electric cable provided between the battery case and the motor case to couple the battery case and the motor case to each other.

3. The electric vehicle according to claim 1,
wherein the battery case has a first portion located above the electric motor and a second portion located forward relative to the electric motor, the second portion having a smaller width in a vehicle width direction than the first portion does.

4. The electric vehicle according to claim 3,
wherein the plurality of batteries are placed forward relative to and above the electric motor, and
wherein a portion of the batteries which is located forward relative to the electric motor has a smaller width in the vehicle width direction than a portion of the batteries which is located above the electric motor.

5. The electric vehicle according to claim 1,
wherein the seat is placed rearward relative to the battery case,
wherein the battery case has a first portion located above the electric motor and having a shape in which a rear region thereof has a smaller width in a vehicle width direction than a front region thereof.

6. The electric vehicle according to claim 5,
wherein the plurality of batteries are placed forward relative to and above the electric motor, and
wherein a rear region of a first portion of the batteries which is located above the electric motor has a smaller width in the vehicle width direction than a second portion of the batteries which is located forward relative to the electric motor.

7. The electric vehicle according to claim 1,
wherein a space formed between the plurality of batteries or between the batteries and the battery case, in an upper portion of the battery case, overlaps with a space formed between the plurality of batteries or between the batteries and the battery case, in a lower portion of the battery case, when viewed from above, and cooling air is guided to the spaces.

8. The electric vehicle according to claim 1, further comprising:
an electric wire through which the AC power is supplied from the inverter to the electric motor,
wherein a space formed between the plurality of batteries or between the batteries and the battery case, in an upper portion of the battery case, overlaps with a space formed between the plurality of batteries or between the batteries and the battery case, in a lower portion of the battery case, when viewed from above,
wherein cooling air is guided to the spaces, and
wherein the electric wire runs through the spaces.

9. The electric vehicle according to claim 1, further comprising:
an electric wire through which the AC power is supplied from the inverter to the electric motor,
wherein the electric wire runs through a region lateral relative to a portion of the batteries located forward relative to the electric motor.

10. The electric vehicle according to claim 1, further comprising:
a radiator placed below a portion of the batteries which is located forward relative to the electric motor.

11. The electric vehicle according to claim 1,
wherein the electric wire includes three bus bars which supply a three-phase AC current from the inverter to the electric motor, and the three bus bars are metal plates stacked and insulatively bonded together.

12. An electric vehicle comprising:
an electric motor which generates a driving power for driving a wheel;

a battery case accommodating a plurality of batteries storing DC power to be supplied to the electric motor, in a battery space in an interior of the battery case;
an inverter which converts the DC power supplied from the batteries into an AC power;
an electric wire through which the AC power is supplied from the invertor to the electric motor;
a radiator placed below a portion of the batteries which is located forward relative to the electric motor; and
a cooling medium pipe extending from the radiator to cool the inverter,
wherein the battery case has a shape which covers the electric motor above and forward, and
wherein the cooling medium pipe and at least one electric wire are placed on opposite sides of the electric vehicle in a vehicle width direction.

13. The electric vehicle according to claim 12,
wherein the cooling medium pipe runs through the interior of the battery case in such a manner that the cooling medium pipe runs through a space formed between a rear region of a portion of the batteries which is located above the electric motor and the battery case.

\* \* \* \* \*